United States Patent [19]
Tada et al.

[11] Patent Number: 6,163,976
[45] Date of Patent: Dec. 26, 2000

[54] VACUUM-TYPE AUTOMATIC DEHUMIDIFYING AND DRYING APPARATUS FOR POWDERED OR GRANULAR MATERIAL

[75] Inventors: Hiroshi Tada; Osamu Matsui, both of Osaka, Japan

[73] Assignee: Kabushikikaisha Matsui Seisakusho, Osaka, Japan

[21] Appl. No.: 09/427,105

[22] Filed: Oct. 26, 1999

[30] Foreign Application Priority Data

Oct. 28, 1998 [JP] Japan .................................. 10-307627

[51] Int. Cl.[7] ...................................................... F26B 21/06
[52] U.S. Cl. ...................................... 34/72; 34/92; 34/168
[58] Field of Search .............................. 34/329, 334, 340, 34/72, 92, 168; 159/4.01, 4.1, 29; 62/93, 238.3, 271

[56] References Cited

U.S. PATENT DOCUMENTS

| | | | |
|---|---|---|---|
| 3,875,683 | 4/1975 | Waters ........................................ | 34/174 |
| 4,294,020 | 10/1981 | Evans ......................................... | 34/168 |
| 4,882,851 | 11/1989 | Wennerstrum et al. ..................... | 34/60 |
| 5,048,200 | 9/1991 | Ryham ...................................... | 34/73 X |
| 5,205,050 | 4/1993 | Masaki et al. ............................. | 34/265 |
| 5,335,425 | 8/1994 | Tomizawa et al. ........................ | 34/265 |
| 5,341,576 | 8/1994 | Tsutmo et al. ............................. | 34/263 |
| 5,548,905 | 8/1996 | Kuma et al. ................................ | 34/92 |

*Primary Examiner*—Stephen Gravini
*Attorney, Agent, or Firm*—Jones, Tullar & Cooper, P.C.

[57] ABSTRACT

A vacuum-type automatic dehumidifying and drying apparatus for powdered or granular material such as a pelletized or powdered resin or the like, provided with a drying hopper connected to an evacuating means having at its bottom a material discharge valve, and provided with a material collector communicating with the drying hopper via a material feeding valve above the drying hopper for collecting the powdered material therein. The apparatus comprises a double constructed drying hopper having a cylindrical main body made of a high heat conductivity material provided on its inner peripheral surface with plural fins, which define compartment walls, projecting inwardly and provided on its outer peripheral surface with a heating means surrounding the cylindrical main body. The main body is outwardly enclosed with a heat insulation wall, and comprises an outer air inlet for introducing outer air thereinto, a material sensor for detecting amount of the material stored in the hopper, and an evacuating means connected to the main body.

6 Claims, 15 Drawing Sheets

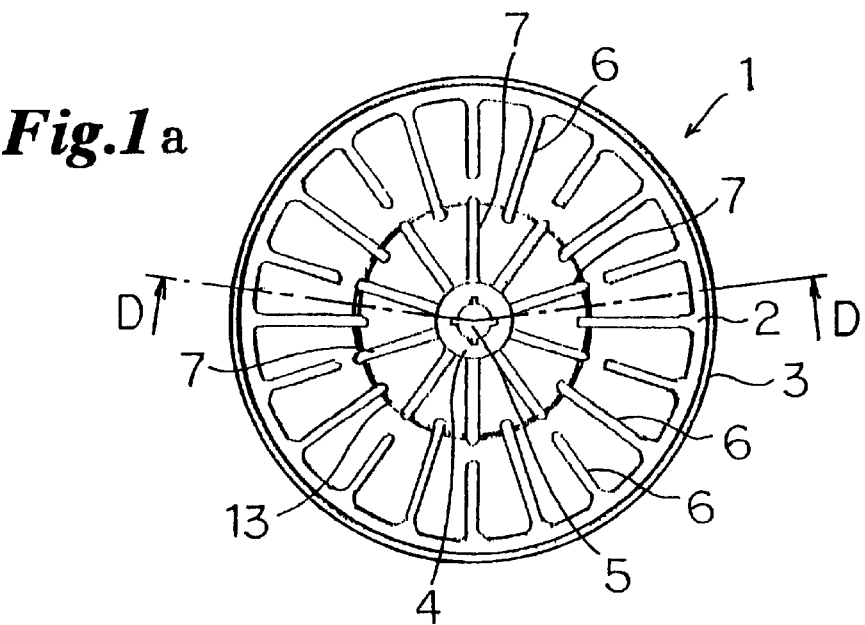
*Fig.1* a
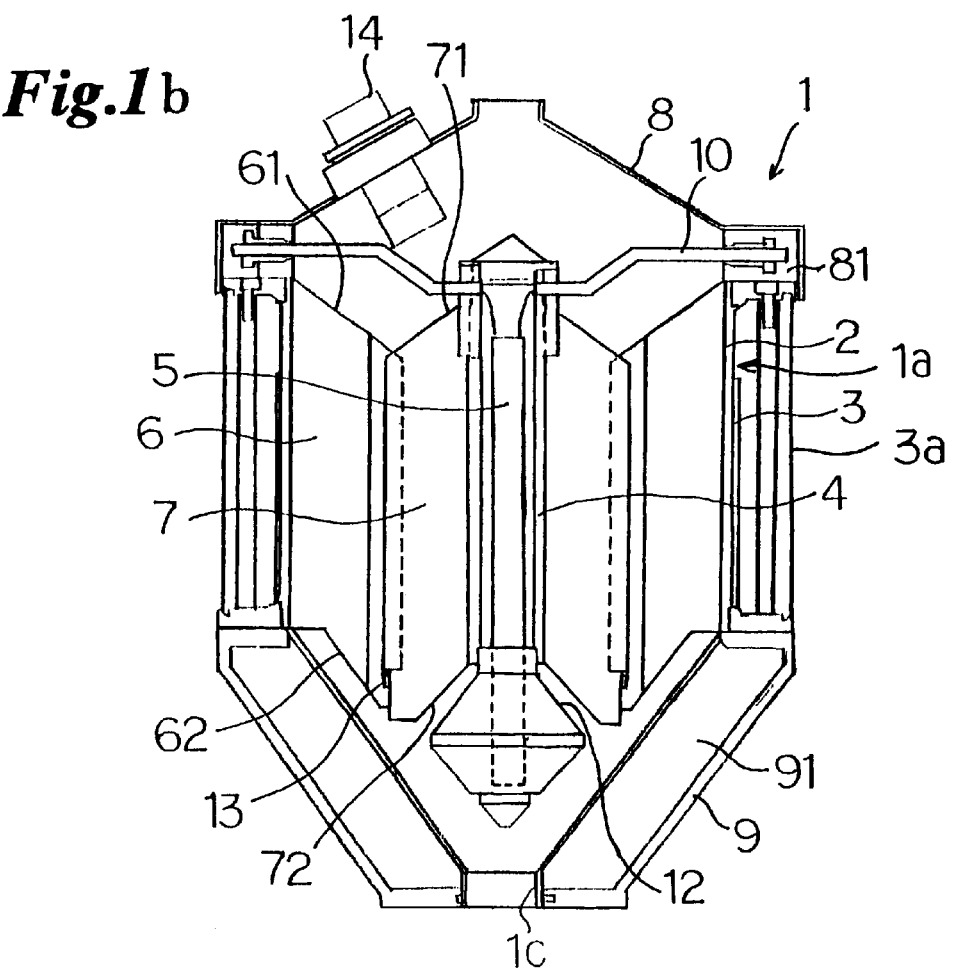
*Fig.1* b

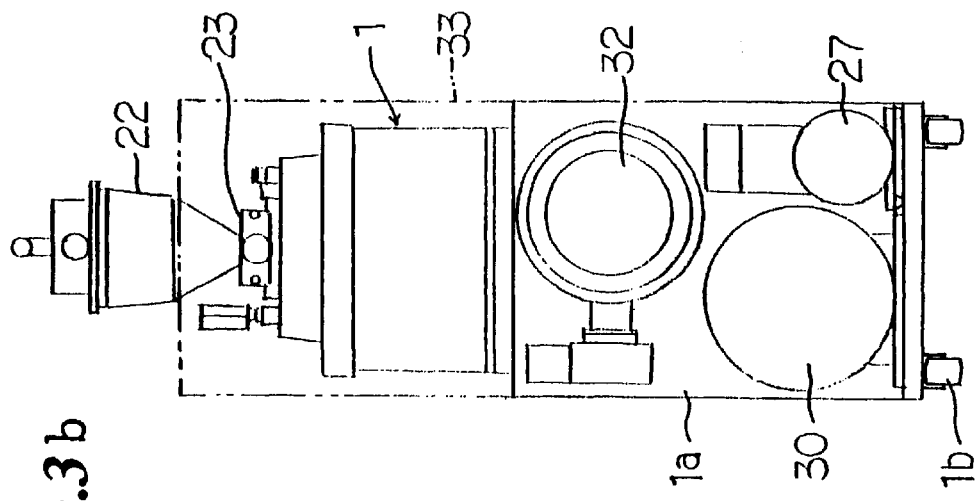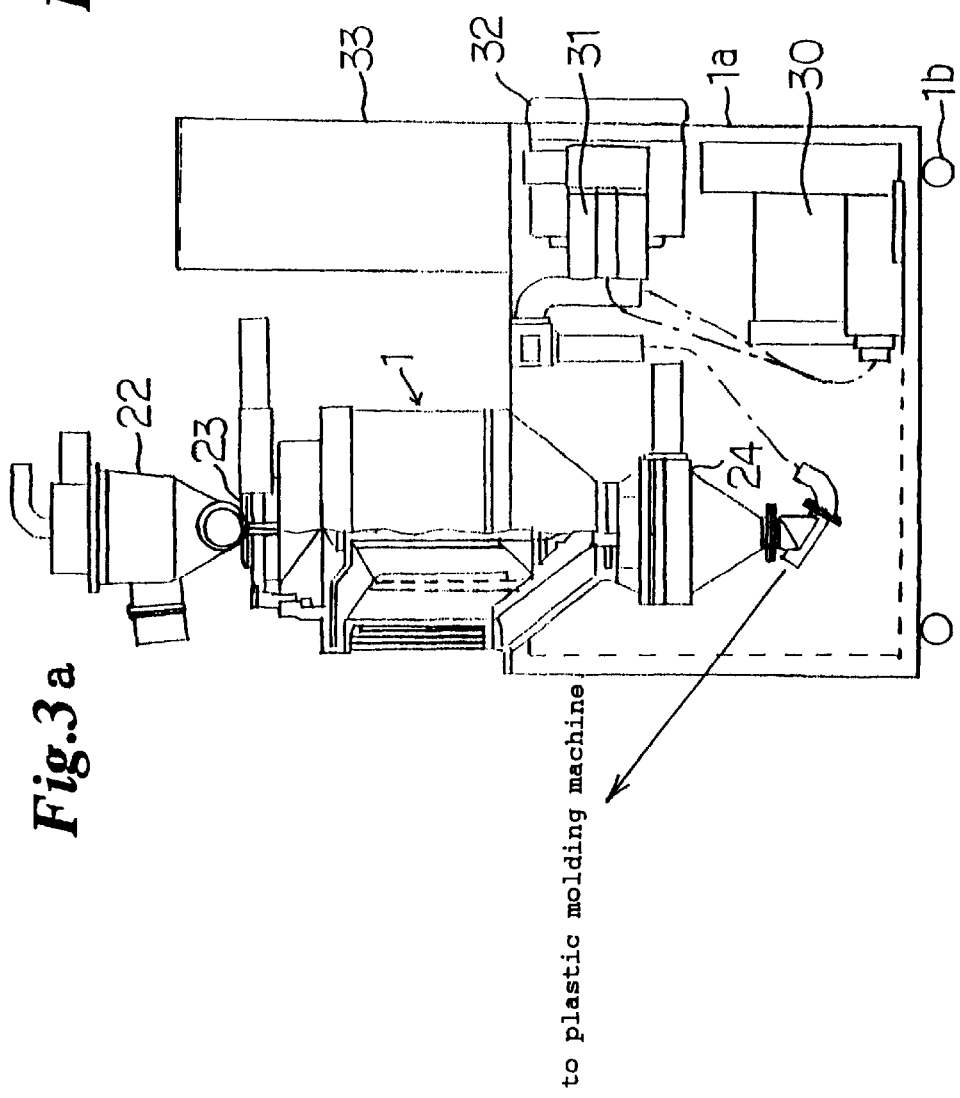

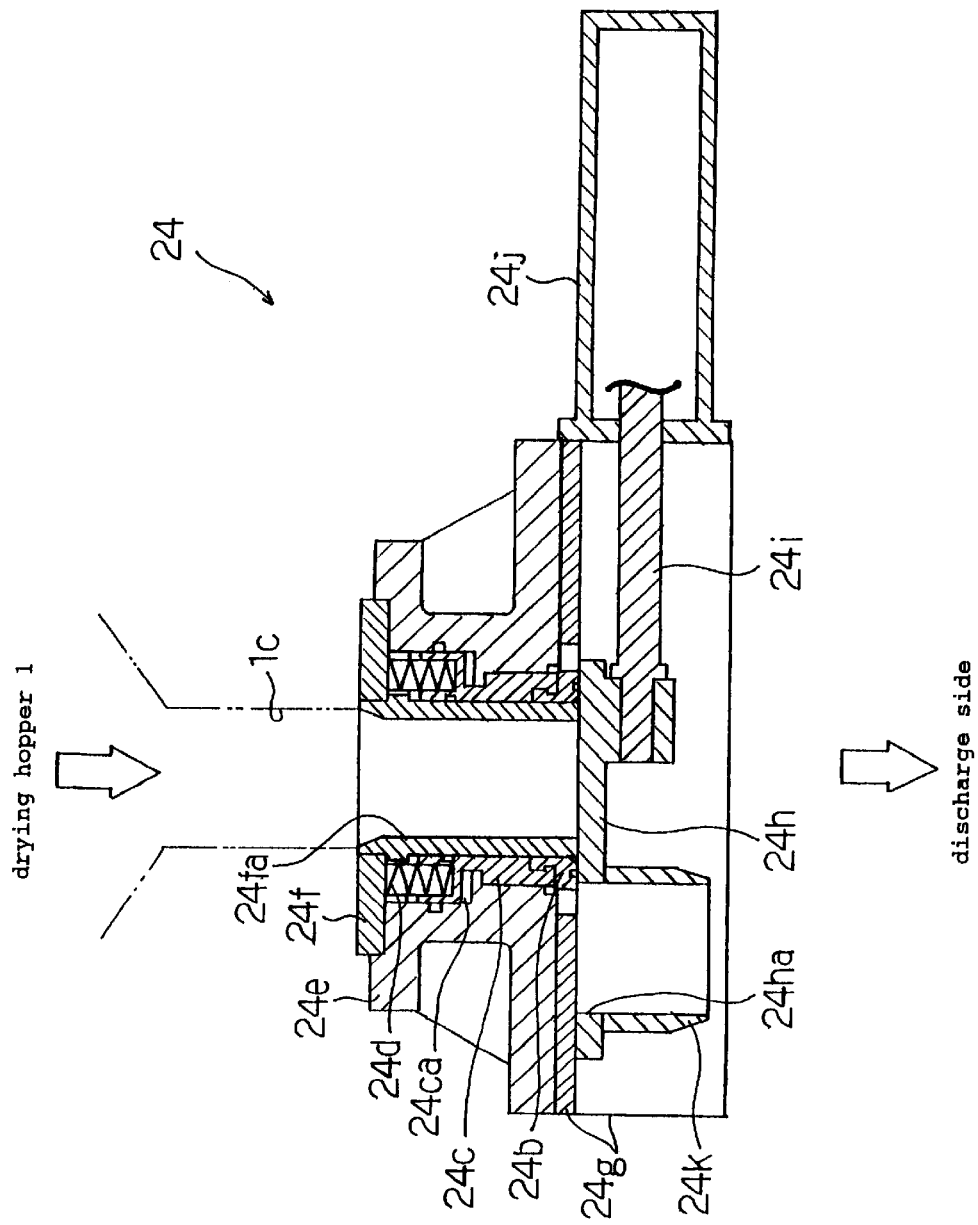

PRIOR ART

VACUUM-TYPE AUTOMATIC DEHUMIDIFYING AND DRYING APPARATUS FOR POWDERED OR GRANULAR MATERIAL

FIELD OF THE INVENTION

The present invention relates to a vacuum-type automatic dehumidifying and drying apparatus for powdered or granular material wherein powdered or granular material is efficiently dehumidified at a short time under vacuum condition and the dehumidified powdered or granular material is automatically discharged and thereafter subsequent material is continuously supplied thereinto for a next execution.

PRIOR ART

A conventional vacuum-type automatic dehumidifying and drying apparatus for powdered or granular material, as shown in FIG. 15, is disclosed in JP-A-6-114834.

According to the vacuum-type automatic dehumidifying and drying apparatus for powdered or granular material C, a supply receiving port 101 comprised of a material suction mechanism 102 and an air separation mechanism 103 for collecting only powdered or granular material and separating air is provided at the top of the system C. A dual constructed main body 107 of the vacuum dehumidifying dryer is provided under the material receiving port 101 via an upper automatic switch valve 104. A heat exchanger 108 comprised of a heat pipe 111 and a fin pipe 110 housing P.T.C. (positive thermal ceramic) coated with composition emitting far infrared radiation is provided in the main body 107.

Under the main body 107 of the vacuum dehumidifying dryer a storage tank 112 for temporally storing raw material is provided via a lower automatic switch valve 115 which is double closing type. A raw material receiving port 113 for a plastic molding machine is provided at the lower end. The members from the supply receiving port 101 at the upper end to the material receiving port 113 at the lower end are constructed vertically.

The dehumidifying dryer C is provided with a vacuum pump 105 so that dehumidified synthetic resin powder is continuously and automatically supplied at a short time with saving energy while evacuating the main body 107 of the dehumidifying dryer.

However, the complicatedly constructed heat exchanger 108 with the vertically extending heat pipe 111 and the fin pipe 101 housing P.T.C is provided at plural parts in the main body 107.

Further because the heat pipe 111 transmits heat from a heating source in a vertical direction, minute heating control such as varying vertical heating temperatures or dividing the heat exchanger vertically can't be achieved.

SUMMARY OF THE INVENTION

The present invention has been proposed to solve the above-mentioned problems. The object of the present invention is to provide a vacuum-type automatic dehumidifying and drying apparatus for powdered or granular material wherein inner construction is simple, heat from a heating source is transmitted in a horizontal direction, minute heating control can be executed and dehumidified material by heating at gentle and uniform temperature is automatically and constantly supplied to a next step.

According to the present invention, a vacuum-type automatic dehumidifying and drying apparatus for powdered or granular material such as a pelletized or powdered resin or the like is provided with a drying hopper having at its bottom a material discharge valve and an evacuating means, and with a material collector communicating with the drying hopper via a material feeding valve above the drying hopper for collecting the powdered or granular material therein.

The dehumidifying and drying apparatus is comprised of a double constructed drying hopper having a cylindrical main body made of a high heat conductivity material provided on its inner peripheral surface with plural fins, which define compartment walls, projecting inwardly and on its outer peripheral surface with a heating means surrounding the cylindrical main body. The hopper is constructed such that the main body is outwardly enclosed with a heat insulation wall.

The dehumidifying and drying appratus is also comprised of an outer air inlet provided with the main body for introducing outer air into the drying hopper, a material sensor in the hopper for detecting amount of the material stored in the hopper, and an evacuating means connected to the main body for evacuating the main body.

Accordingly powdered or granular material which is fed and stored in the drying hopper until the material sensor is turned off is heated in the main cylindrical body by driving the heating means while keeping the drying hopper vacuum by the evacuating means during dehumidifying and drying process, while required amount of dehumidified and dried powdered or granular material in the drying hopper is discharged by opening the material discharge valve after the drying hopper is returned to an atmospheric pressure condition by opening the outer air inlet, and sequentially powdered or granular material is fed again from the material collector to the hopper for next dehumidifying and drying process by opening the material feed valve until the material sensor is turned off.

"Vacuum" in this specification should be construed as a wide concept including a condition pressurized under atmospheric pressure.

The dehumidifying and drying system is characterized in that it is provided with a heat conducting heating means.

The present invention has an eye on the material itself comprising a drying hopper. Material with excellent heat conductivity such as aluminum is used instead of iron and stainless steel which has been used in the prior art. Therefore, it is characterized in that a heating means (heat generation means) can be provided a fixed distance apart from powdered or granular material to be heated by actively utilizing the heat conductivity of the material.

Conventionally a heat conductor associating the heating means and the object to be heated hasn't been recognized actively. Therefore, the heating means has been provided as close as possible to the object to be heated according to the conventional dehumidifying dryer. Namely, the complicatedly constructed heat exchanger with the fin pipe housing P.T.C. and the heat pipe has been provided everywhere in the drying hopper.

However according to such a construction, the system is complicated and the heating means hasn't been divided vertically because the heat pipe transmits heat in vertical direction.

On the other hand, according to the present invention, a heating means is provided only at outside of a heating hopper as a rule and the heat from the heating means runs through powdered or granular material in the drying hopper by actively utilizing heat conductivity of the material of the heating hopper.

Therefore, plural compartment walls and fins are extended inwardly from the inner circumference of the cylindrical heat conducting wall comprising the drying hopper. The compartment walls are made of the same material as the heat conducting wall and gently conducts heat supplied from the heating means by heat conduction into a central direction at uniform temperature so as to gently heat powdered or granular material in the drying hopper.

The compartment walls extending inwardly have a predetermined width so that heat conduction is executed efficiently. The compartments in the drying hopper divided by the compartment walls have almost the same sectional area. Accordingly heat conducting area is designed to be widen to improve heating efficiency so that powdered or granular material can be heated uniformly and divided as minute as possible.

The characteristic of the heating means of the present invention lies on that heat is transferred in a horizontal direction from the heating means (heat generation means), not in a vertical direction like a heat pipe.

The heating means can be departed at a fixed distance from the object to be heated so that there are only compartment walls extending vertically in the hopper dryier. Furthermore, heat transferring direction is horizontal because a heat pipe isn't used in the hopper so that the hopper dryer can be easily divided vertically.

Additionally, such a dehumidifying drying system is a little deteriorated on the point of heat conducting time comparing to the conventional idea that heating means is provided as close as possible to the object to be heated for cutting down heating time, expediting, and heating uniformly. However, the present invention has eyes on heat conductivity of the material such as uniform temperature and gentle heating and proposes an idea that the heating means is set apart from the object to be heated. Looking overall, the present invention can achieve equal heating efficiency comparing to direct heating and obtain an effect like simplified construction.

Next, the present invention is characterized in that dehumidifying and drying system is provided with the outer air introduction port for assuring discharge or feed of material while being dehumidified under vacuum condition.

Generally if the drying hopper is vacuum and the material collector at a former step and piping to a next step aren't kept vacuum, laminated condition of powdered or granular material in the drying hopper is destroyed because of rapid outer air flow and the bevel regulating member doesn't have a meaning to be provided. In order to eliminate such a phenomenon, the drying hopper is returned to be atmospheric pressure like the former step and the next step from vacuum condition by means of the outer air introduction port, then the material feed valve and the material discharge valve should be opened.

The outer air introduction port is provided in order that the inside pressure and outside pressure of the drying hopper becomes the same when material is discharged or fed. Accordingly material can be discharged or fed by appropriately breaking vacuum condition of the drying hopper even when material is dehumidified under vacuum condition.

However, such an outer air introduction port isn't required if the material collector at the former step and the pipe to the next step are kept at the same vacuum degree or depressurized degree as the drying hopper.

Further, the material collector may not be always required according to the embodiment of the former step.

According to other embodiment of the vacuum-type automatic dehumidifying and drying apparatus of the present invention, the drying hopper is provided with a leak adjustment mechanism with a leak hole for controlling introduction amount of a carrier gas to be fed from outside into the drying hopper, of which moisture and temperature have been previously controlled, whereby useless gas heated in the drying hopper is discharged corresponding to the amount of the carrier gas introduced through the leak adjustment mechanism by driving the evacuating means during dehumidifying and drying process.

According to such a dehumidifying and drying system, it is further characterized in that carrier gas displacement is utilized.

The carrier gas displacement is characterized in that heating and dehumidifying are separated unlike the conventional vented dehumidifying and drying system wherein heating and dehumidifying of powdered or granular material are treated as a whole. In the present invention, dehumidifying is executed such that moisture vapor and gaseous body including useless gas such as volatile gas generated from powdered or granular material in the drying hopper are replaced by carrier gas of which moisture and temperature are adjusted. Therefore, this method is called a carrier gas displacement.

The carrier gas indicates gas introduced into the drying hopper from outside. The carrier gas is preferably set at a predetermined temperature, has lower moisture and lower consistency of impurities than gas generated from the powdered or granular material to be dried and discharged from the hopper dryer. Nitrogen gas is included in carrier gas other than air and atmospheric air depending on dehumidifying condition complying with the kinds of powdered or granular material to be dried.

If such a carrier gas displacement is used, powdered or granular material can be dehumidified by the amount of carrier gas several times as the actual air amount in the hopper dryer excluding the volume of stored powdered or granular material comparing to the conventional vented dehumidifying and drying system which requires heated air several ten times as the actual air amount. Therefore, required gas amount for dehumidifying can be remarkably reduced, the system can be compact and dehumidifying can be executed efficiently at short time.

Further, when preferable carrier gas is used, drying efficiency is more improved and adverse effect on the object to be dried can be eliminated.

According to still other embodiment of the present invention, the drying hopper comprises an outer compartment member provided on its inner peripheral surface with plural fins radially projecting toward the center of the main body, an inner compartment member disposed in the center space of the main body and having plural fins radially projecting toward the fins of the outer compartment member. The drying hopper also comprises a bevel regulating member disposed under the inner compartment member between a material discharging hole of the drying hopper and the inner compartment member. Each fin of the compartment member is formed at its upper end with an upper cut-away portion which is inclined downwardly to the center of the main body and at its lower end with a lower cut-away portion which is inclined downwardly to the center of the main body, and each fin of the inner compartment member is formed at its upper end with an upper cut-away portion which is inclined downwardly to the fin of the outer compartment compartment and at its lower end with a lower cut-away portion which is inclined downwardly to the fin of the outer compartment member.

Accordingly, material fed into the drying hopper is sequentially dehumidified and dried in the drying hopper and thereafter discharged in a manner of first-in and first-out execution.

The dehumidifying and drying system is characterized in that the bevel regulating member is provided and the shape of the inner compartment member where the bevel regulating member is provided is specified. When material is discharged or supplied, the drying hopper should be at atmospheric pressure in order to have an effect of the bevel regulating member, as mentioned above.

Therefore, according to the dehumidifying and drying system, the effect of a first-in-first-out plug of the bevel regulating member can be adequately achieved and dehumidified powdered or granular material is sequentially discharged from the lower layer and new material is fed on the upper layer while keeping the laminated condition in the hopper dryer. As the result, powdered or granular material in the lower layer is more dehumidified so that the most dehumidified powdered or granular material is sequentially discharged. On the other hand, powdered or granular material to be dehumidified is laminated on the upper layer. Accordingly the vacuum-type dehumidifying and drying system can automatically and constantly supply perfectly dehumidified powdered or granular material to a next step.

According to still other embodiment of the present invention, the material discharge valve further comprises a slide plate slidably disposed under a material discharge hole provided at the lower portion of the drying hopper and provided with a discharge subsidizing pipe for inducing the material stored in the drying hopper through the material discharge hole. The discharge subsidizing pipe has a material induction portion projecting downwardly, and a driving means for reciprocating the slide plate between an open position for discharging the material where the material discharging hole conforms with the material discharging hole of the drying hopper and a close position for stopping discharging of the material.

This dehumidifying and drying system is characterized in that the discharge subsidizing pipe is provided for the material discharge valve as a prevention method of material catching for assuring automatic and constant discharge of dehumidified powdered or granular material.

The discharge subsidizing pipe is extended at a predetermined distance so that the tip end thereof is out of alignment with a peak of the material formed at an angle of repose of discharged powdered or granular material. Therefore, material flow into discharging direction is always generated when the valve is closed, thereby eliminating material biting.

According to further embodiment of the present invention, the material feed valve is provided at the upper cover of the main body of the drying hopper and the cover is detachably attached to the main body of the drying hopper.

According to still further embodiment of the present invention, the material feed valve is provided at the upper cover of the main body of the drying hopper and the cover is pivotally jointed to the main body of the drying hopper in a manner capable of being opened and closed.

The dehumidifying and drying system is constructed such that the upper cover of the drying hopper main body provided with the material supply valve is detachable or open-close type so as to be easily removed. When it is removed, the compartment walls vertically extending in the hopper and so on are exposed under completely opened condition so that cleaning is facilitated.

BRIEF DESCRIPTION OF THE DRAWINGS

FIG. 1a is a plane view of a hopper dryer of one embodiment of a vacuum-type automatic dehumidifying and drying apparatus for powdered or granular material of the present invention.

FIG. 1b is its vertical section.

FIG. 3a is a partially cut away front view of an outer view of a main body of a vacuum-type automatic dehumidifying an drying apparatus for powdered or granular material according to the present invention.

FIG. 3b is its side view.

FIG. 8 is a vertical section showing one embodiment of a material discharge valve of the vacuum-type automatic dehumidifying and drying apparatus for powdered or granular material of the present invention.

PREFERRED EMBODIMENT OF THE INVENTION

Figure 2:
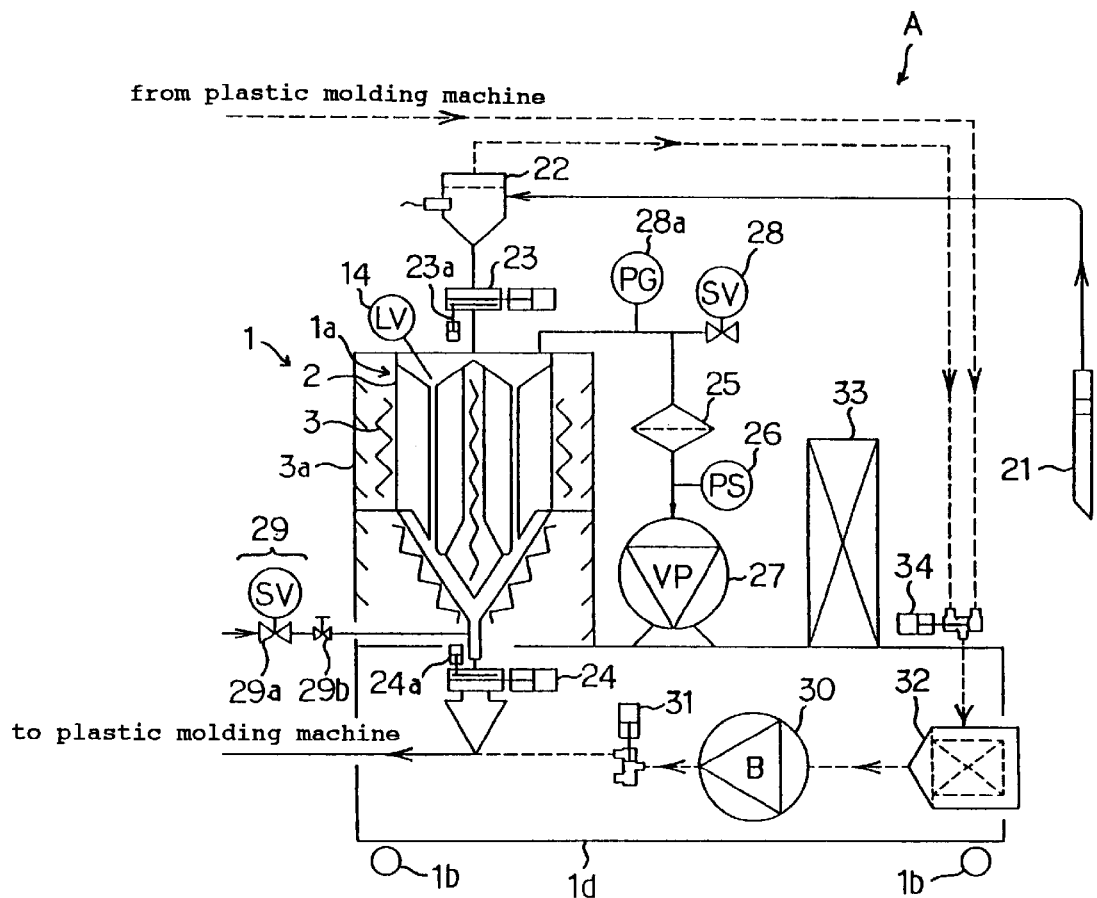
FIG. 2 is a schematic diagram showing the whole construction of a preferred embodiment of a vacuum-type automatic dehumidifying and drying apparatus for powdered or granular material according to the present invention.

A preferred embodiment of the dehumidifying and drying apparatus for powdered or granular material according to the present invention will be explained referring to the attached drawings.

At first, a drying hopper comprised of a heat conducting heating means which is a characteristic of the present invention will be explained.

FIG. 1a and FIG. 1b shows a hopper dryer of one embodiment of a vacuum-type automatic dehumidifying and drying apparatus for powdered or granular material of the present invention. FIG. 1a is its plane view and FIG. 1b is its vertical section. FIG. 1b is a vertical section of D—D in FIG. 1a and hatching is omitted so as to prevent complication and a part of a bevel regulating member is shown as its outer view.

The hopper dryer 1 is provided with a cylindrical heat conducting wall 2 defining an outer compartment member made of a material excellent in heat conductivity, such as aluminum, at a periphery of the hopper dryer 1 as shown in FIG. 3a and FIG. 3b. An outer heating means 3 is provided around the heat conducting wall 2, a heat conducting cylinder 4 defining an inner compartment member made of a material excellent in heat conductivity, such as aluminum, is provided in the hopper dryer 1, and an inner heating means 5 comprised of a pipe heater is provided at the center of the heat conducting cylinder 4.

Plural fins 6 are vertically extended from the heat conducting wall 2 so as to inwardly extend at the same width and at a same space, while plural fins 7 are radially extended from the center of the heat conducting cylinder 4 into the heat conducting wall 2 at the same width and at the same space. The fins 6 define outer compartment walls and fins 7 define inner compartment walls. It is preferable that there are appropriate spaces between the facing ends of the fins 6 and 7 so as not to stop powdered or granular material or the tip ends are touched.

The heat conducting wall 2, the outer heating means (heat generation means) 3, the heat conducting cylinder 4, the inner heating means (heat generation means) 5, the fins 6, and the fins 7 comprise a hopper main body 1a and also comprise the heat conducting heating means. When the capacity of the drying hopper is small, it is preferable that the hopper main body 1a and the heat conducting heating means are comprised of only the heat conducting wall 2, the outer heating means (heat generation means) 3, and the compartment walls 6.

The fins 6, 7 in the hopper dryer preferably extend radially from outward to inward or from inward to outward. However, if heat conduction is favorably executed and heat is uniformly conducted to the powdered or granular material in the drying hopper at a constant temperature, the compartment walls may extend in different ways. Or the fins 6 and 7 may not be the same width or may not be provided at the same space.

Thus small compartments divided by the heat conducting wall 2, the heat conducting cylinder 4, and the fins 6 and 7 are produced. The fins 6 have almost the same sectional area so that conducting heat from the heat conduction wall 2 is uniformly transferred to the material contained in the small compartments. The fins 6 and 7 are provided as many as possible so as to widen the surface area for heat conduction, thereby improving heat conductivity. Further, the fins 6 and 7 have predetermined width so that heat applied on the heat conductivity wall 2 is uniformly transferred into the tip ends of the fins 6 and 7 considering heat conductivity of the material.

When heat conductivity of the material of the drying hopper 1 is compared, that of alloy steel is 37 Kcal/mhr° C., that of stainless steel is about under 20 Kcal/mhr° C. Contrarily that of aluminum used in the present invention is 175 Kcal/mhr° C., which is remarkably different. That of pure copper is 360 Kcal/mhr° C. and is excellent in its heat conductivity, however, it may have adverse effect on material when pure copper is directly touched with the material so that it is required to be appropriately coated. Therefore, pure copper has many troubles to be employed.

Each upper end of the fins 6 extending inwardly from the heat conducting wall 2 is provided with upper cut-away portion 61 inclining downward into the center and each lower end of the walls 6 is provided with a lower cut end 62 inclining downward into the center.

Each upper end of the fins 7 of the heat conducting cylinder 4 is provided with a projection 71 inclining downward from the center of the heat conducting cylinder 4 to the periphery of the heat conducting wall 2 and each lower end of the fins 7 is provided with cut-away portion 72 inclining downward from the center of the heat conducting cylinder 4 to the periphery of the heat conducting wall 2.

The heat conducting wall 2 is cylindrical and comprises a main body of the drying hopper 1. The heat conducting wall 2 is provided with an upper cover 8 above and a lower tapered portion 9 narrowing into the center of the main body. The upper cover 8 and the lower tapered portion 9 are fixed with the heat conducting wall 2 by means of attachment bolts (not shown). The heat conducting cylinder 4 is supported and fixed by suspending at the center of a pipe 10 bridged between the inner walls of a lower reinforcement casing 81 of the upper cover 8. Further, the heat conducting wall 2 of the heating hopper 1 is preferably cylindrical, however, it may be oval cylindrical or angular cylindrical.

The upper cover 8 is detachable for the hopper main body 1a by means of a bolt means (not shown) provided for the lower reinforcement casing 81. When the upper cover 8 is removed, a material collector 22 provided with a material feed valve 23, will be explained hereinafter, (FIG. 2 and FIG. 3), the heat conducting cylinder 4 and the fins 7 can be removed at the same time.

When they are removed, the inside of the hopper main body 1a is exposed and the compartment walls 6 are seen. The fins 6 extend vertically so that powdered or granular material attached on the fins 6 can be easily dropped by blowing pressurized air from upward, thereby facilitating cleaning. The heat conducting cylinder 4 and the fins 7 which are removed with the cover 8 can be cleaned like the same as the compartment walls 6.

A bevel regulating member 12 is fixed under the heat conducting cylinder 4 housing the inner heating means 5 comprised of a pipe heater by means of a screw insertion (not shown). The bevel regulating member functions as a first-in-first-out plug.

The lower tapered portion 9 is formed with a hollow 91 at inner circumference thereof and a band heater as a heating means may be further provided for the hollow 91.

The lower part of the fins 7 is supported at the lower part of the outer compartment walls 6 via a ring body 13. The ring body 13 has enough width on which upper end powdered or granular material stayes. If the upper end is beveled, powdered or granular material doesn't remain thereon.

According to the drying hopper provided with such a heat conducting heating means, powdered or granular material supplied in the drying hopper 1 can be heated indirectly, gently and at equable temperature and uniformly dehumidified by means of conducting heat of the heat conducting wall 2, the heat conducting cylinder 4, and the fins 6 and 7 heated by the outer heating means 3 provided at outer periphery of the heat conducting wall 2 and by the inner heating means 5 provided at the center of the inner heat conducting cylinder 4. Further, powdered or granular material in the small compartment divided by the heat conducting wall 2, the heat conducting cylinder 4, and the fins 6 and 7 is efficiently heated by conducting heat from the surface of the surrounding heat conductivity wall 2.

Furthermore, the upper end of each fin 6 is formed with the inclined cut-away portion 61 and the upper end of the fin 7 is formed with the projection 71, respectively. Therefore, when powdered or granular material is fed from upward, it doesn't remain on these upper ends and can be equally divided and charged between each fin 6 and 7 without trouble. The lower ends of fin 6 and 7 are respectively formed with the inclined cut-away portion 62 and 72 so that it is convenient for providing the plug 12.

The inclined lower cut-away portions 62 and 72 are decided according to the shape of the lower hopper to which the compartment walls are adjacent and the shape of the plug 12. It depends on an idea that heat conducting area is increased as large as possible by deforming the lower cut-away portion conforming with the shape of other parts. The cut-away portion conforming to the other parts may not be always provided according to the required heat conducting area.

The upper cut-away portion 61 and the projection 71 are provided for preventing powdered or granular material from remaining. Such a cut-away portion 61 isn't always required if the same function can be achieved. For example, the upper ends of the fins 6 and 7 are formed horizontal and beveled such as round chamfer so as not to remain powdered or granular material thereon.

The conventional heating means such as a heat pipe made of copper may have an adverse effect on the powdered or granular material to be heated. However, the material of the heat conducting wall 2, the heat conducting cylinder 4 and the fins 6 and 7 comprising the drying hopper and directly touching powdered or granular material in the present invention is made of a material such as aluminum which doesn't have adverse effect on powdered or granular material while heating.

The drying hopper 1 is preferably made of aluminum and executed with a surface hardening treatment of an alumite and so on. In such a case, the hopper 1 has little adverse effect on powdered or granular material, is excellent for durability, and lasts a long time.

A nichrome heater or a ceramic heater may be provided for the heat conducting wall 2 and the heat conducting cylinder 4 as the heating means 3 and 5 and they may be partially provided so as to heat paritally.

If aluminum is used for the drying hopper 1, the heat conducting wall and the compartment walls are preferably formed integrally by means of an extrusive mold or a pull-out mold. The surface thereof is made smooth so that powdered or granular material doesn't attach on the surface and can be transferred from upward to downward of the drying hopper 1 smoothly.

Then, the whole construction of a vacuum-type automatic dehumidifying and drying apparatus for powdered or granular material according to the present invention will be explained.

FIG. 2 is a schematic diagram showing the whole construction of a preferred embodiment of a vacuum-type automatic dehumidifying and drying apparatus for powdered or granular material according to the present invention. FIG. 3a and FIG. 3b show an outer view of a main body of a vacuum-type automatic dehumidifying and drying apparatus for powdered or granular material according to the present invention. FIG. 3a is its partially cut away front view and FIG. 3b is its side view.

The dehumidifying and drying apparatus A in FIG. 2 is a floor set type wherein a double constructed drying hopper 1 covering a hopper main body 1a provided with the cylindrical heat conducting wall 2 and the heating means provided around the wall 2 with a heat covering wall 3a is placed on the base 1d. And rollers 1b are provided under the base so as to be movable.

The drying hopper 1 has a nozzle 21, the collector 22, the material feed valve 23 and the material discharge valve 24 which are provided for the material tank. Powdered or granular material sequentially fed in the drying hopper 1 for dehumidifying is suck by the nozzle 21, collected in the collector 22, and fed in the drying hopper 1 by means of the material feed valve 23. Dehumidified powdered or granular material by means of carrier gas displacement in the drying hopper 1 is discharged from the material discharge valve 24 provided under the hopper 1 into a plastic molding machine at a next step.

The material feed valve 23 and the material discharge valve 24 are provided with a sealing mechanism for keeping the closed drying hopper 1 airtight and further sealing detachable mechanisms 23a and 24a are provided in order that the sealing mechanism isn't worn away when the valves are operated.

A material sensor 14 comprised of a level gauge (LV) is provided for detecting the amount of powdered or granular material in the drying hopper 1, an evacuating means 27 comprised of a vacuum pump (VP) is provided for the base 1d for evacuating the drying hopper 1, the evacuating means 27 is connected to the upper part of the hopper dryer 1 via a pipe. The pipe is provided with a pneumatic sensor (PS) 26 for detecting a predetermined vacuum degree, a filter for filtering sucking air, an outer air introduction port 28 for returning the vacuum hopper 1 into atmospheric pressure, and a pressure gauge (PG) 28a for measuring vacuum degree or depressurized degree in the hopper 1. The outer air introduction port 28 is comprised of a solenoid valve (SV), however it isn't limited to such a valve.

According to the dehymidifying and drying apparatus A, the evacuating means 27 comprises a depressurization means for generating moisture vapor or useless miscellaneous gas such as volatile gas from powdered or granular material and also works as a gas discharge means for discharging gaseous body including useless gas in the drying hopper outside.

A leak adjustment mechanism 29 with a leak hole is provided with a valve 29a for introducing carrier gas used for carrier gas displacement and a control valve 29b comprising a control mechanism of introduction amount is connected under the drying hopper 1 and a blowing side of a material transport blower (B) 30 is connected at the lower end of the material discharge valve 24 through a transport switch valve 31.

A transport filter 32 for filtering transport air is provided at a suction side of the material transport blower 30 and transport discharge from a plastic molding machine at a next step or from the collector 22 is selectively connected to the transport filter 32 through a switch valve 34. A control board 33 for controlling the whole dehumidifying and drying apparatus A is provided for the base 1d.

The main body of the dehumidifying and drying apparatus of powdered or granular material including the drying hopper 1 is constructed such that the collector 22 is placed on the drying hopper 1 via the material feed valve 23 and the material discharge valve 24 is placed under the hopper 1 as shown in FIG. 3a and FIG. 3b. The blowing side of the transport blower 30 is switchably connected to the discharge side of the discharge valve 24 through the transport switch valve 31.

The evacuating means (vacuum pump) 27 is provided beside the transport blower 30, the transport filter 32 is provided above the blower 30, and the control panel 33 is provided above the filter 32 for controlling the whole system.

Those members are placed on the base 1*d* so that the dehumidifying and drying apparatus A is constructed compactly and movable. Therefore, the dehumidifying and drying apparatus A can be conveniently used at desirable place.

According to the dehumidifying and drying apparatus A utilizing carrier gas displacement, the blowing side of the transport blower 30 is opened by switching the transport switch valve 31 and the suction side of the transport blower 30 is connected to the collector 22 by switching the switch valve 34 into the collector 22 side so that powdered or granular material is collected in the collector 22 through the nozzle 21.

Powdered or granular material is fed and stored in the drying hopper 1 from the collector 22 until the material sensor 14 sends a signal, the material feed valve 23 and the material discharge valve 24 are closed so that the drying hopper 1 is kept airtight, stored powdered or granular material is heated by the heating means 3, then powdered or granular material is depressurized by reducing the pressure in the drying hopper 1 at a predetermined level by the evacuating means 27.

Thus, moisture contained in the powdered or granular material is generated as moisture vapor and volatile component is generated as a volatile gas.

Moisture vapor and volatile gas are generated by only heating powdered or granular material. However, some material is deteriorated when being heated at high temperature. In such a case depressurization is simultaneously executed so that boiling point of water is lowered and moisture vapor and volatile gas can be generated at lower temperature. In order to accelerate vaporization and volatilization depressurization is preferably executed at the same time.

Thus, while moisture vapor and volatile gas are generated in the drying hopper 1, carrier gas of which moisture and temperature are controlled is introduced from the leak adjustment mechanism 29 into the dehumidifying and drying apparatus A and simultaneously gaseous body including useless gas in the drying hopper 1 is suck by the evacuating means 27 and introduced outside of the hopper 1, thereby powdered or granular material is dehumidified.

Concretely, normal atmospheric air is used as carrier gas. While outer air is introduced by controlling the control valve 29*b* of the leak adjustment mechanism 29, the same amount of gas as the introduced air in the drying hopper 1 is suck by the evacuating means 27 and the drying hopper 1 is kept at a predetermined reduced pressure by the pressure gauge 28*a*.

Thus powdered or granular material is dehumidified by using carrier gas displacement, powdered or granular material can be dehumidified by the amount of carrier gas several times as the actual air amount in the hopper dryer excluding the volume of stored powdered or granular material comparing to the conventional vented dehumidifying and drying system which requires heated air several ten times as the actual air amount. Therefore, required gas amount for dehumidifying can be remarkably reduced, the system can be compact and dehumidifying can be executed efficiently at short time.

If a filter, a dryer and a heating means are provided before the leak adjustment mechanism 29 for eliminating powder dust and carrier gas in which atmospheric air is heated and dried is introduced, dehumidifying can be more effectively executed. Further, nitrogen gas which doesn't have adverse effect on powdered or granular material can be used as a carrier gas depending on the kinds of powdered or granular material.

It is preferable that the leak adjustment mechanism 29 is connected to the bottom of the drying hopper 1 and a suction port of the evacuating means 27 is provided above the hopper 1, however, the present invention doesn't limit to such a construction.

After dehumidifying or during dehumidifying, outer air is introduced by the outer air introduction port 28 if requested by the next step. The material discharge valve 24 is automatically opened after the pressure in the drying hopper 1 is returned to atmospheric pressure and dehumidified powdered or granular material is discharged from the lowest layer of the lamination by means of the first-in-first-out plug 12.

The switch valve 34 is switched to a plastic molding machine side and the transport switch valve 31 is switched so that the material is transported to the plastic molding machine at a next step by the transport blower 30.

Accordingly dehumidified powdered or granular material can be automatically and continuously fed. Further, powdered or granular material to be dehumidified is supplied to the drying hopper 1 from the collector 22 if necessary.

The reason why the drying hopper 1 is returned to atmospheric pressure when powdered or granular material is discharged or fed is that outer air is rapidly poured in the drying hopper 1 because of the pressure difference from outside when the material discharge valve 24 is opened if the drying hopper 1 is vacuum so that laminated condition of powdered or granular material in the hopper 1 is destroyed. Therefore, if before and after the material feed valve 23 and the material discharge valve 24 are kept at the same pressure by keeping the collector 22 vacuum, it isn't required to return the hopper 1 to atmospheric pressure when material is discharged or fed.

Figure 4:
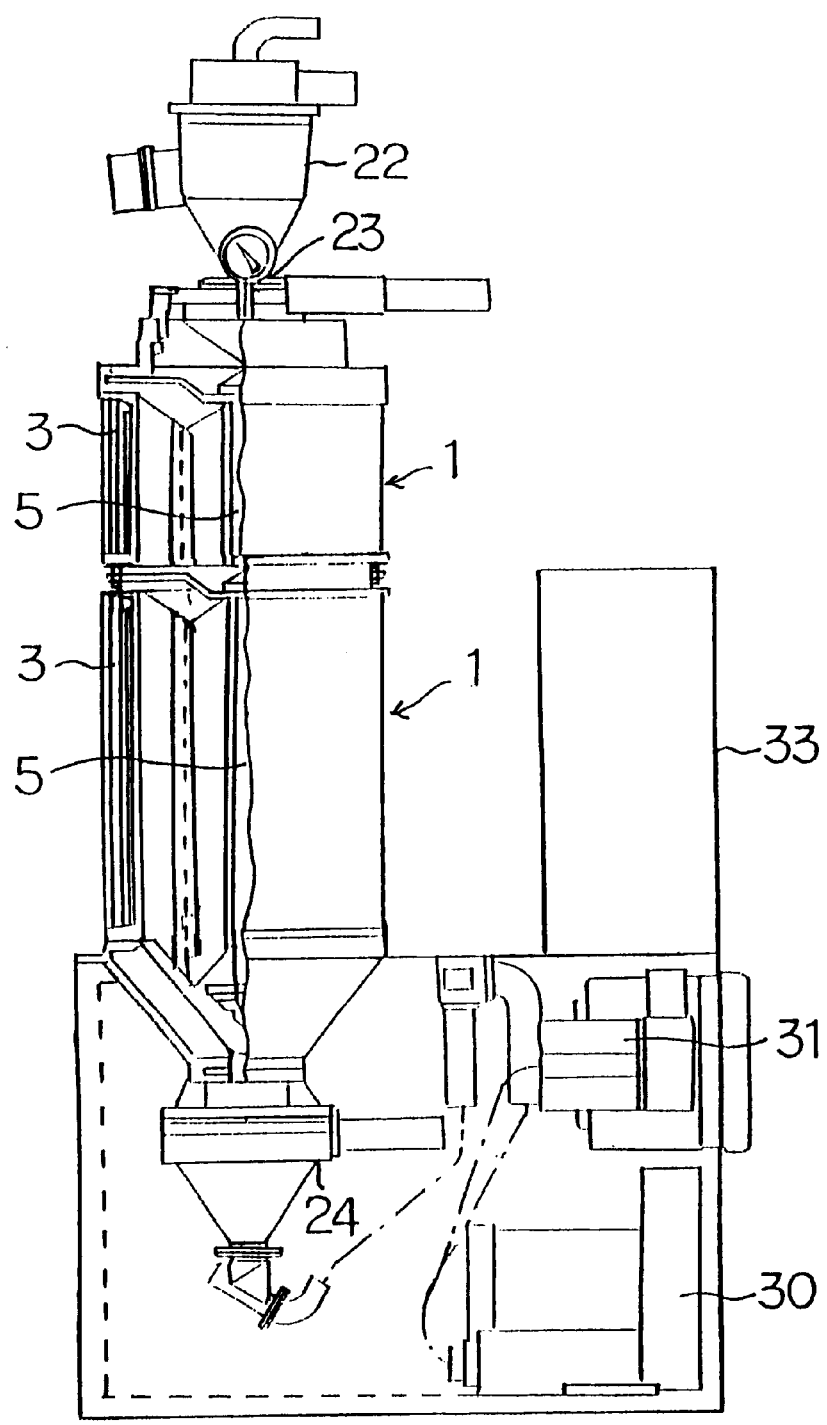
FIG. 4 is a partially cut away front view showing outer view of the main body of the other embodiment of the vacuum-type automatic dehumidifying and drying apparatus for powdered or granular material according to the present invention.

FIG. 4 is a partially cut away front view showing outer view of the main body of the other embodiment of the vacuum-type automatic dehumidifying and drying apparatus for powdered or granular material according to the present invention. The same members and parts as the above-mentioned dehumidifying and drying system (FIG. 3) are referred as the same reference numerals and their explanations are omitted.

The hopper dryer 1 is constructed so as to be divided into two parts vertically. The independent heating means 3 and 5 are provided for each part.

The hopper dryer 1 in this embodiment is divided into two vertical parts, however, it may be divided into more than two parts. According to the dehumidifying and drying apparatus of the present invention, heat transferring direction from the heating means is mainly horizontal so that the drying hopper 1 can be divided into upper and lower parts.

If the drying hopper is vertically (up and down) divided into plural parts, maintenance such as disassembling and cleaning can be facilitated.

Further, the vertically divided parts are provided with the independent heating means 3 and 5 respectively and powdered or granular material in the drying hopper 1 can be controlled at different heating temperature at the upper or lower part, or an upper, middle or lower part.

Figure 5:
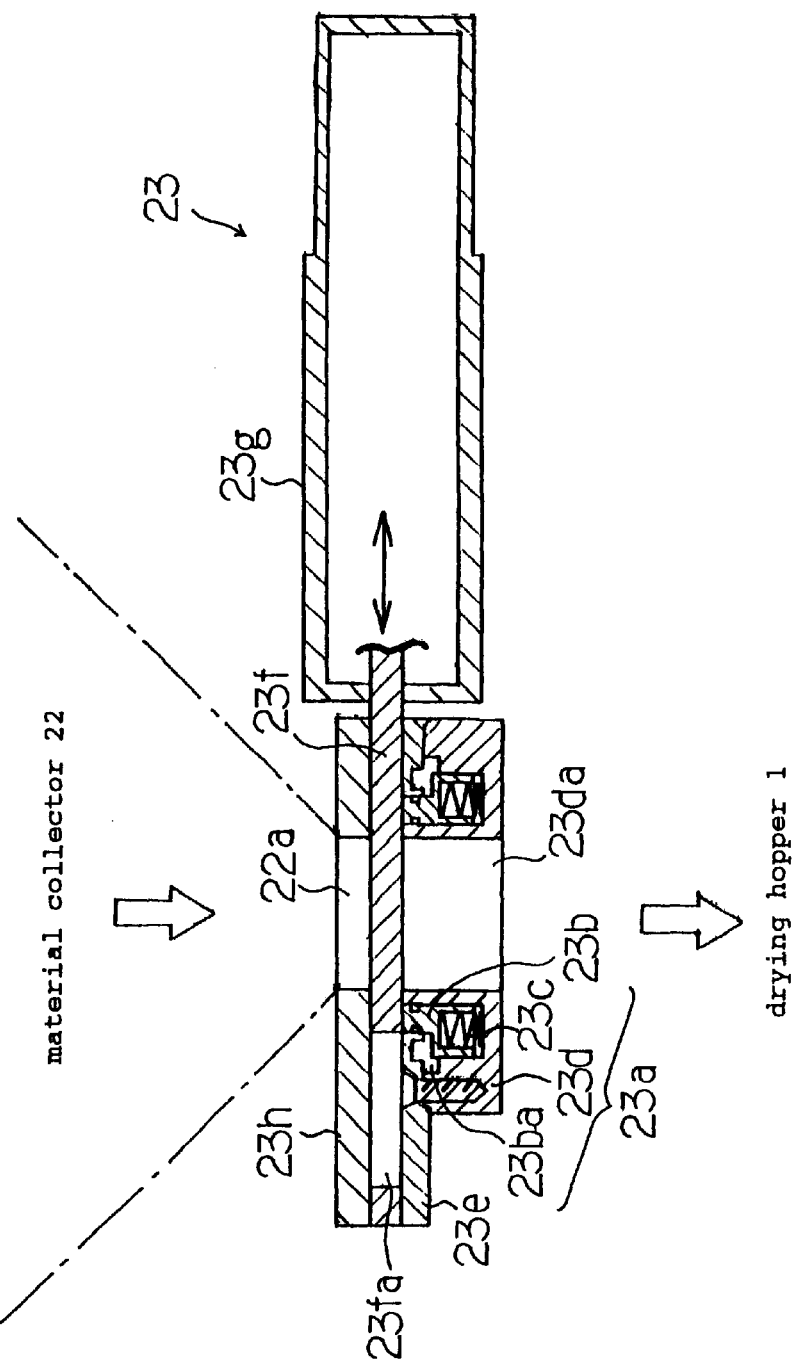
FIG. 5 is a vertical sectional view showing one embodiment of the material feed valve of the vacuum-type automatic dehumidifying and drying apparatus for powdered or granular material according to the present invention.
Figure 6:
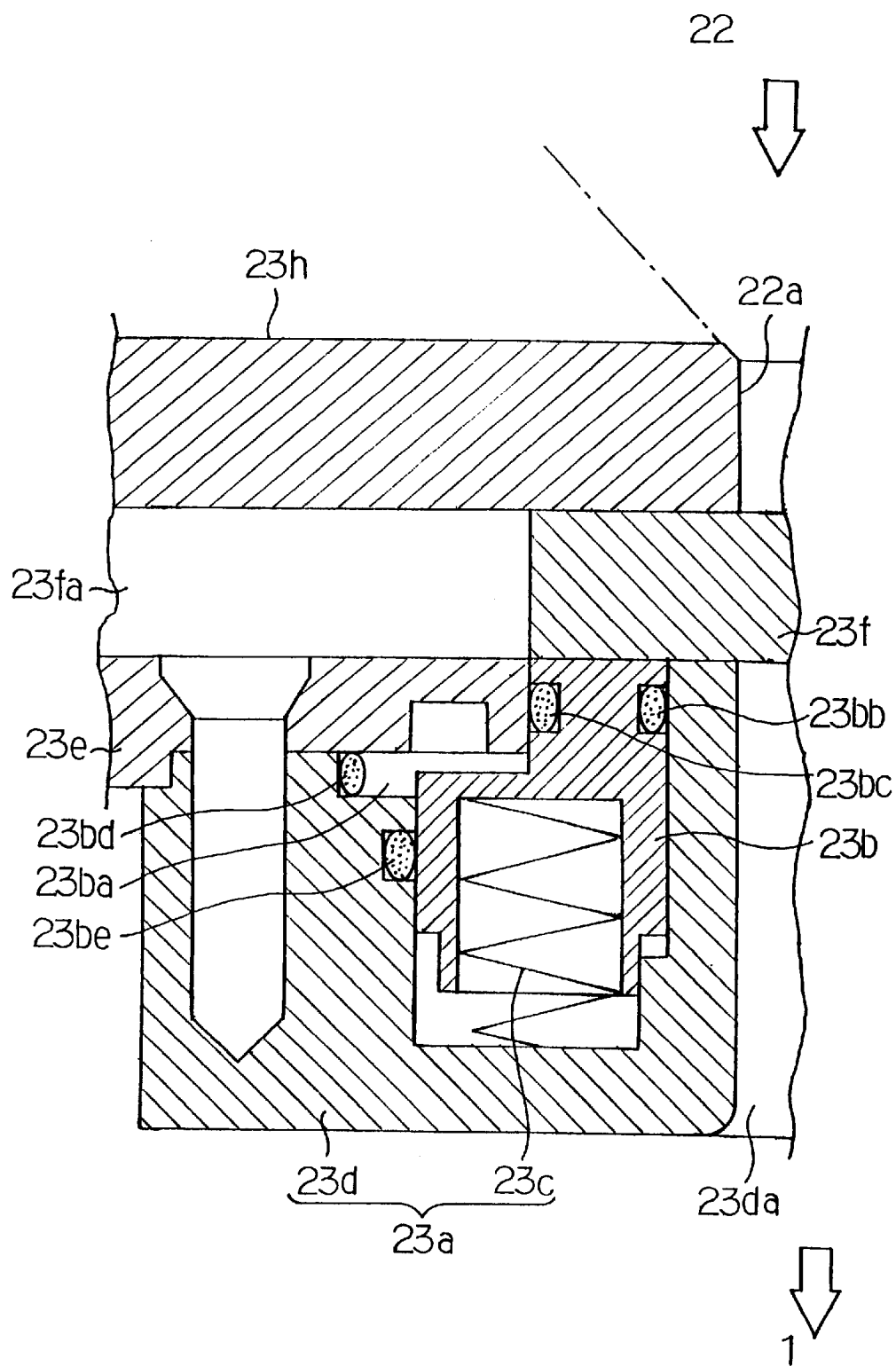
FIG. 6 is a vertical section showing details of the sealing detachable mechanism of the material feed valve.
Figure 7:
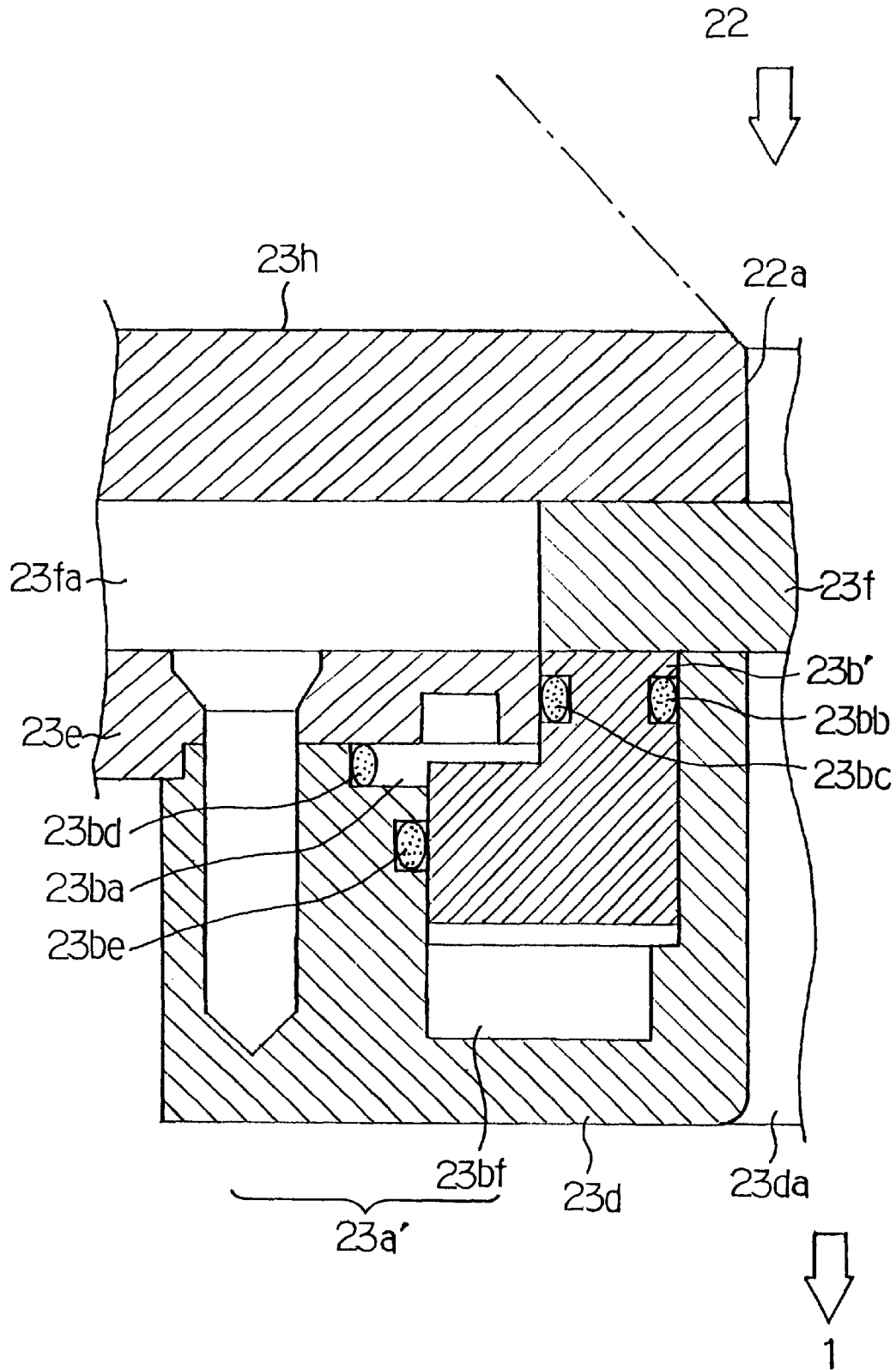
FIG. 7 is a vertical section showing details of other embodiment of the sealing detachable mechanism of the material feed valve.

FIG. 5 is a vertical sectional view showing one embodiment of the material feeding valve of the vacuum-type automatic dehumidifying and drying apparatus for powdered or granular material according to the present invention. FIG. 6 is a vertical section showing details of the sealing detachable mechanism of the material feed valve. FIG. 7 is a vertical section showing details of other embodiment of the sealing detachable mechanism of the material feed valve.

FIG. 6 is an enlarged view of the sealing detachable mechanism 23a in FIG. 5. A sealing ring 23bb and so on are formed like a ring surrounding a feed hole 23da at the hopper side. The section shows when a part is cut off.

According to such a material feed valve 23, when a slide plate 23f provided with a slide feed hole 23fa is slid by an air cylinder 23g so as to accord with a receiving hole 22a of a valve case upper plate 23h provided for a discharge outlet of the material collector 22, powdered or granular material is fed in the drying hopper (open). When the slide plate 23f doesn't meet with the receiving hole 22a, as shown in the figure, material is prevented from being fed (closed).

The material feed valve 23 is provided for a valve case body 23d when the slide plate 23f is at a close position in the figure and is provided with the hopper side feed hole 23da opened at the drying hopper side and a sealing mechanism 23b for sealing a flat part between the hopper side feed hole 23da and the slide plate 23f. Therefore, the drying hopper 1 can be kept airtight when the material feed valve 23 is closed.

Further, the material feed valve 23 is provided with a sealing detachable mechanism 23a comprised of a valve case lower plate 23e as a lower guide of the slide plate 23f, the valve case body 23d being attached on the valve case lower plate 23e and forming a space therein, the sealing mechanism 23b contained in the valve case body 23d so as to be movable up and down, a sealing spring 23c enforcing the sealing mechanism 23b upward, O-rings 23bb, 23bc, 23bd, 23be for keeping sealing among the sealing mechanism 23b, the valve case lower plate 23e and the valve case body 23d.

According to such a sealing detachable mechanism 23a, when the slide plate 23f is moved or opened, the sealing mechanism 23b is moved downward opposing to enforcement force of the sealing spring 23c and the sealing mechanism 23b is designed so as not to touch the slide plate 23f as shown in the two-dotted lines in FIG. 6 by feeding pressurized air into an airtight space 23ba formed by the sealing mechanism 23b, the valve case lower plate 23e, and the valve case body 23d. Therefore, the sealing mechanism 23b isn't worn away by the movement of the slide plate 23f so that sealing ability of the sealing mechanism 23b is kept for a long time and the durability of the material feed valve 23 is improved.

The sealing detachable mechanism shown in FIG. 7 is a modified embodiment of the sealing detachable mechanism 23a in FIG. 6. The same parts as FIG. 6 are referred as the same numerals and their explanations are omitted.

A sealing detachable mechanism 23a' doesn't use the sealing spring 23c for enforcing the sealing mechanism comparing to the sealing detachable mechanism 23a. Instead, a sealing mechanism 23b' without having a spring hole is used and is moved upwardly to be enforced by feeding pressurized air into an airtight space 23bf formed by the bottom of the sealing mechanism 23b' and the valve case body 23d.

FIG. 8 is a vertical section showing one embodiment of a material discharge valve of the vacuum-type automatic dehumidifying and drying apparatus for powdered or granular material of the present invention.

The discharge valve 24 also has a sealing mechanism 24b and a sealing detachable mechanism 24a like the material feed valve 23.

According to the discharge valve 24, a slide plate 24h having a slide discharge hole 24ha is slid by a piston rod 24i of an air cylinder 24j, of which combination construct slide plate driving means, so that the hole 24ha conforms with a receiving hole 24fa of a valve case upper plate 24f provided for a discharge hole 1c of the drying hopper 1, then powdered or granular material is discharged from the drying hopper (open position). When they don't meet, powdered or granular material is prevented from being discharged (close positon).

The material discharge valve 24 is comprised of the sealing mechanism 24b for sealing a flat part between the receiving hole 24fa opened at a hopper side of the valve case upper plate 24f and the slide plate 24h when the slide plate 24h is at a closing position shown in the figure. Therefore, when the material discharge valve 24 is closed, the drying hopper 1 is kept airtight. In this embodiment, a driving means for reciprocating the slide plate is composed of the air cylinder 24j with the piston rod 24i.

Further, the material discharge valve 24 is comprised of a sealing detachable mechanism 24a which is provided with a valve case lower plate 24g for guiding the slide plate 24h, a valve case body 24e attached with the valve case lower plate 24g at its lower part and the valve case upper plate 24f at it upper part and formed with a space therein, the sealing mechanism 24b and a sealing mechanism holding ring 24c housed in the valve case body 24e so as to be movable up and down, a sealing spring 24d enforcing the sealing mechanism holding ring 24c and the sealing mechanism 24b downward, and an O-ring (not shown) for keeping sealing among the sealing mechanism holding ring 24c, the valve case upper plate 24f, and the valve case 24e.

According to such a sealing detachable mechanism 24a, when the slide plate 24h is moved or is at an open condition, the sealing mechanism 24b is moved upward by opposing enforcing power of the sealing spring 24d like FIG. 6 by feeding pressurized air into an airtight space 24ca formed between the sealing mechanism holding ring 24c and the valve case body 24e so as not to touch the sealing mechanism 24b with the slide plate 24h. Therefore, the sealing mechanism isn't worn away by the movement of the slide plate 24h, sealing ability of the sealing mechanism 24b is kept for a long time, and the durability of the material discharge valve 24 is improved.

The material discharge valve 24 is further provided with a discharge subsidizing pipe 24k at a discharge side of the slide discharge hole 24ha of the slide plate 24h. The discharge subsidizing pipe 24k has an inner diameter corresponding to the slide discharge hole 24ha and extends at a fixed distance into a discharge direction. The inner diameter of the discharge subsidizing pipe 24k is the same as or larger than the inner diameter of the slide discharge hole 24ha in order that powdered or granular material doesn't attach.

Figure 9A:
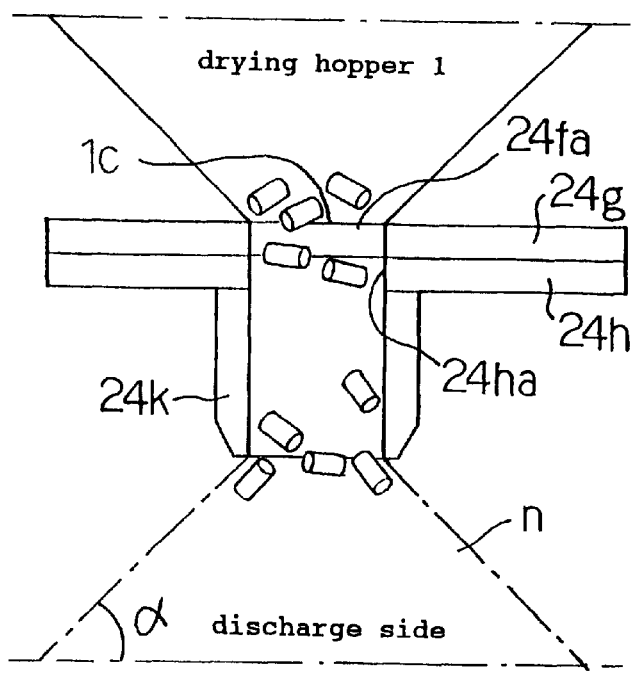
FIG. 9a and FIG. 9b show a basic concept of operational principle of the discharge subsidizing pipe of the material discharge valve according to the present invention.
Figure 9B:
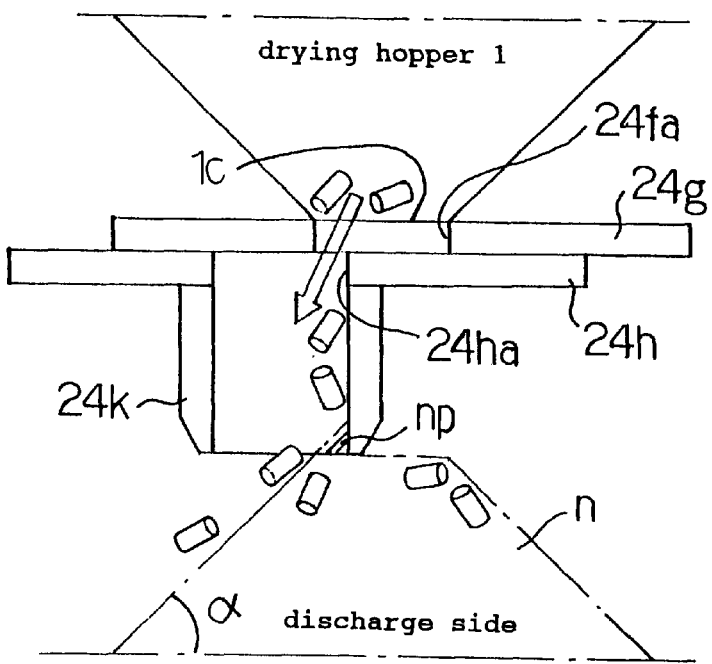

FIG. 9a and FIG. 9b show a basic concept of operational principle of the discharge subsidizing pipe according to the present invention. FIG. 10a and FIG. 10b show a basic concept of operational principle of the conventional discharge subsidizing pipe. FIG. 9a and FIG. 10a show an opened condition and FIG. 9b and FIG. 10b show a condition immediately before being closed.

Function and effect of the discharge subsidizing pipe 24k will be explained.

Figure 10:
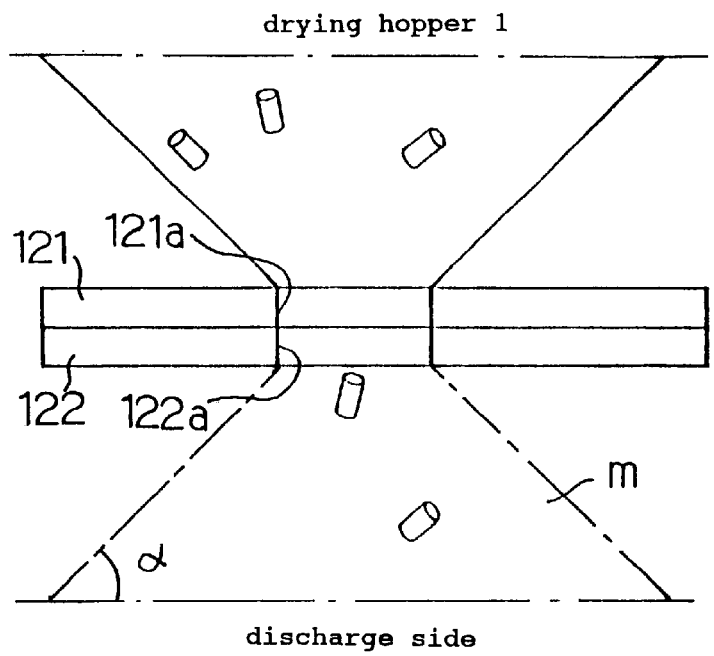
FIG. 10a and FIG. 10b show a basic concept of operational principle of the conventional material discharge pipe.
Figure 10:
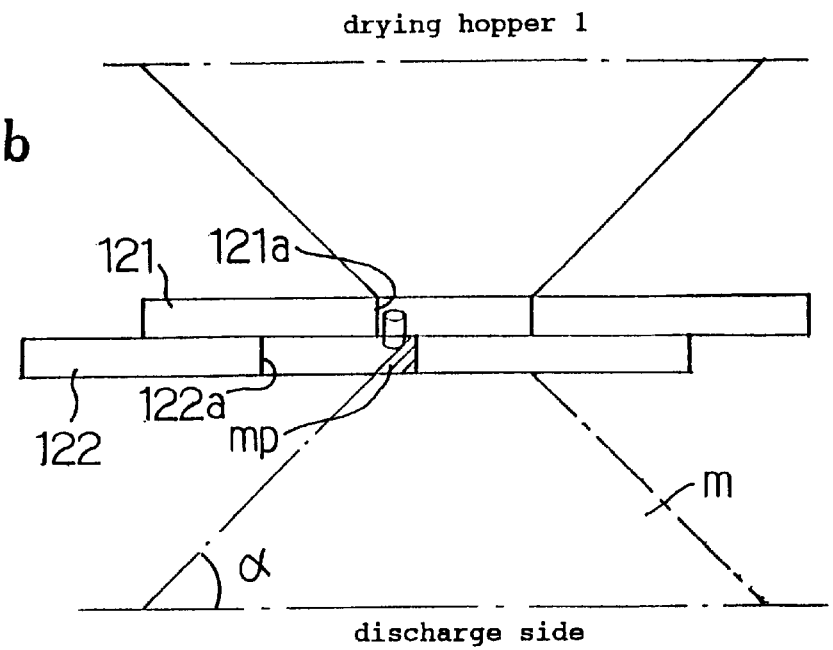

According to the conventional material discharge valve in FIG. 10, the valve is opened and closed by sliding a slide plate 122 having a slide discharge hole 122a with the same diameter of a hopper discharge hole 121a against a plate 121 with the hopper discharge hole 121a. Under opened condition in FIG. 10a, material is stabilized and isn't discharged further at the time when a piled material (m) defined by an angle of repose α which is inherent to powdered or granular material is formed.

Under such a condition, when the slide plate 122 is going to be closed, powdered or granular material (mp), formed by the angle of repose α, which is stabilized and remaining stationary is left immediately before the slide plate 122 is closed like FIG. 10b. Therefore, powdered or granular material at its position is remained and apt to be caught by the hopper discharge hole 121a of the plate 121 and the edge of the slide discharge hole 122a of the slide plate 122.

On the other hand, when the discharge subsidizing pipe 24k is provided, piled powdered or granular material (n) defined by the angle of repose α of powdered or granular material is formed under an open condition in FIG. 9a, however, the piled material (n) is formed lower than the end of the discharge subsidizing pipe 24k comparing to the piled material (m) of the conventional art.

When the slide plate 24h is closed, there is always a place where powdered or granular material isn't charged at the tip end of the discharge subsidizing pipe 24k so that material discharge flow from the drying hopper 1 to a discharge side is always produced in the discharge subsidizing pipe 24k.

Powdered or granular material (np), fomred by the angle of repose α, which is stabilized and remaining stationary is left like FIG. 10, however, it is shown only at the tip of the discharge subsidizing pipe 24k so that it doesn't become a problem. Therefore, powdered or granular material always flows in a discharging direction between the slide discharge hole 24ha of the slide plate 24h and the receiving hole 24fa of the drying hopper side which are being closed (FIG. 9b). Accordingly material is prevented from being caught therebetween.

Figure 11:
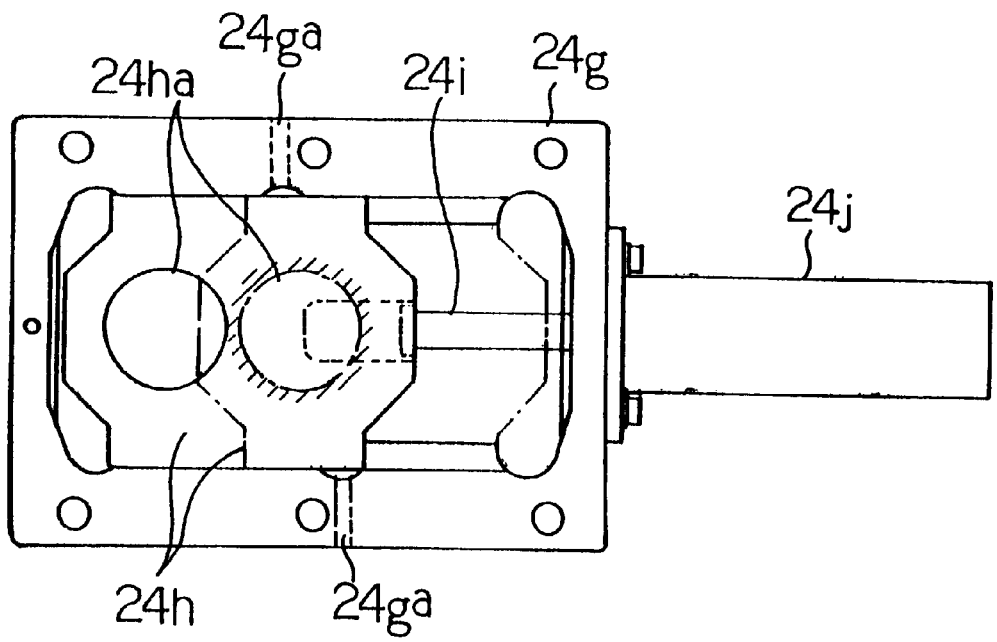
FIG. 11 is a partial plane view showing a dust scattering mechanism of the material discharge valve of the preferred embodiment.

FIG. 11 is a partial plane view showing a dust scattering mechanism of the discharge valve of the preferred embodiment.

The dust scattering mechanism will be explained referring to FIG. 8 and FIG. 11.

In FIG. 11 the material discharge valve 24 in FIG. 8 is seen from above when the valve case body 24e, the sealing mechanism 24b, the sealing mechanism holding ring 24c, the valve case upper plate 24f and the valve case lower plate 24g are removed. In this figure, the solid line shows a closed condition of the slide plate 24h (same as FIG. 8) and the dotted line shows an open condition.

The valve case lower plate 24g of the material discharge valve 24 is provided with a pair of dust scattering mechanisms 24ga opposing each other so as to embrace the slide discharge hole 24ha when the slide plate 24h is opened.

When the slide plate 24h is opened, the sealing mechanism 24b is apart from the slide plate 24h as explained in FIG. 8 and dust of powdered or granular material from a discharge side is apt to be scattered on the surface of the slide plate 24h. If such dust remains at the hatched part in the figure, namely at the part which should be sealed by being contacted with the sealing mechanism 24b when the slide plate 24h is closed, there is an adverse effect on sealing ability.

When the slide plate 24h is closed, pressurized air is injected from the dust scattering mechanism 24ga and a cycle flow is formed so as to cover the hatched part before the sealing mechanism 24b touches the hatched part for sealing. Therefore, at least the dust on the hatched part is scattered away so as to drop in a discharge side and sealing ability of the valve is improved.

Figure 12:
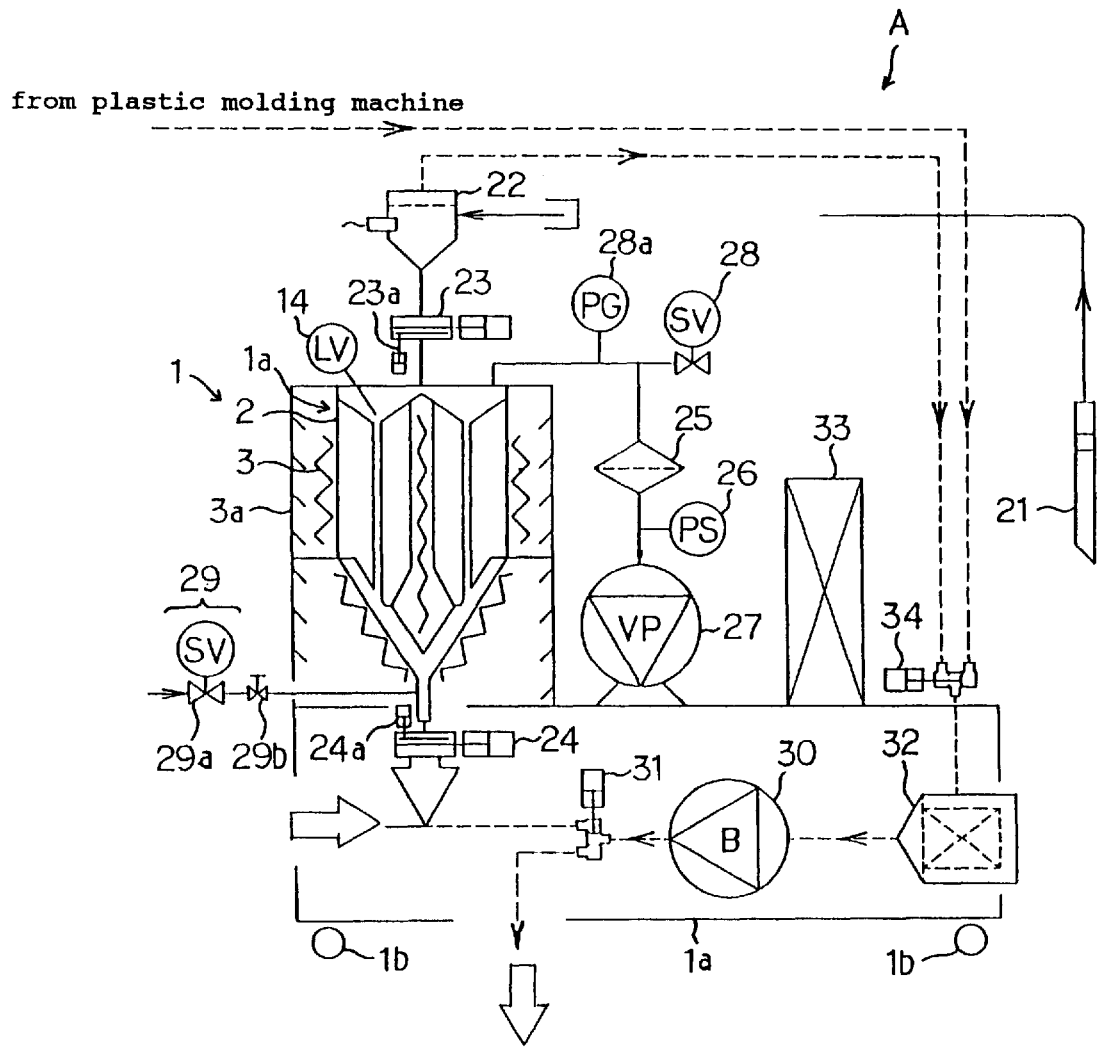
FIG. 12 is a schematic diagram showing a cooling mechanism of a preferred embodiment of the vacuum-type automatic dehumidifying and drying apparatus for powdered or granular material according to the present invention.

FIG. 12 is a schematic diagram showing a cooling mechanism of a preferred embodiment of a vacuum-type automatic dehumidifying and drying apparatus for powdered or granular material according to the present invention.

The different parts from FIG. 2 will be explained hereinafter and the common parts are referred as the same numerals and their explanations are omitted.

According to such a cooling mechanism, after all the powdered or granular material is discharged from the collector 22 and the drying hopper 1, piping from the nozzle 21 to the collector 22 is shut off, the material feed valve 23 and the material discharge valve 24 are opened, piping to a plastic molding machine at a next step is opened, the material switch valve 31 is switched so as to discharge heated air in the drying hopper 1 by blowing air from the transport blower 30 for transporting material, the blower 30 is operated so that outer air passes through the drying hopper 1 from the material collector 22 and is discharged outside.

Such a cooling mechanism is provided because inner cleaning can't be done for exchanging a lot of powdered or granular material under normal heating condition (130° C.~140° C.) and it takes a long time for cooling and exchanging a lot of material when the system is left as it is.

It has taken two or three hours for cooling if the cooling mechanism isn't provided. However, cooling time becomes 20 or 30 minutes and exchanging time of material lot can be remarkably reduced by providing the cooling mechanism.

Figure 13:
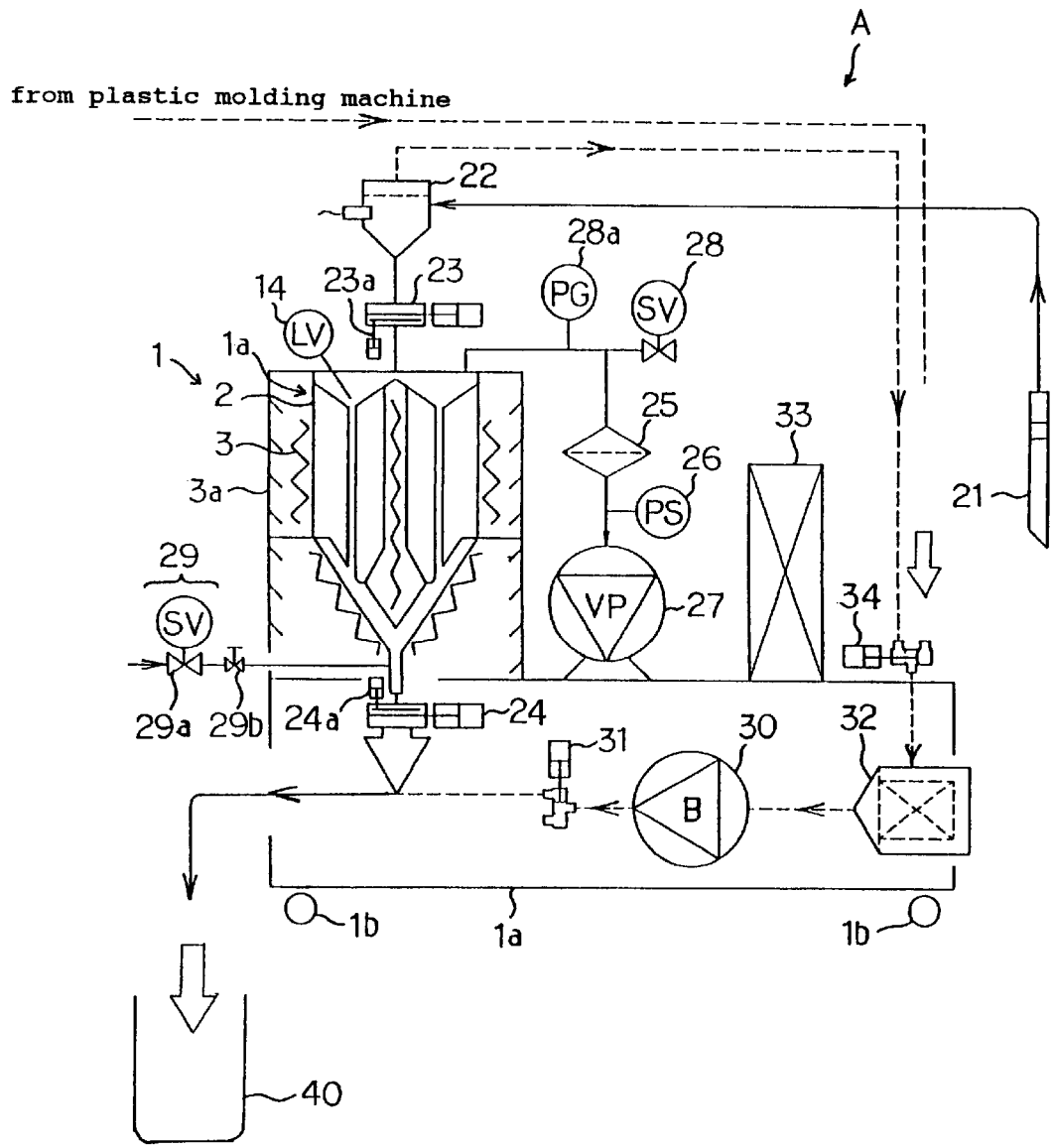
FIG. 13 is a schematic diagram showing a material exhausting mechanism of a preferred embodiment of the vacuum-type automatic dehumidifying and drying apparatus for powdered or granular material according to the present invention.

FIG. 13 is a schematic diagram showing a material exhausting mechanism of a preferred embodiment of a vacuum-type automatic dehumidifying and drying apparatus for powdered or granular material according to the present invention.

The material exhausting mechanism is provided for introducing its cut opening into a separately provided remaining material container 40 while piping to a plastic molding machine at a next step is temporarily cut off.

Conventionally powdered or granular material remained in the drying hopper 1 in case of exchanging a material lot has been discharged from a drain provided under the material discharge valve 24. However, collecting operation at such a low position forces an operator into a low posture and improvement has been desired.

Operation can be done at comfortable position by providing such a material exhausting mechanism.

Figure 14:
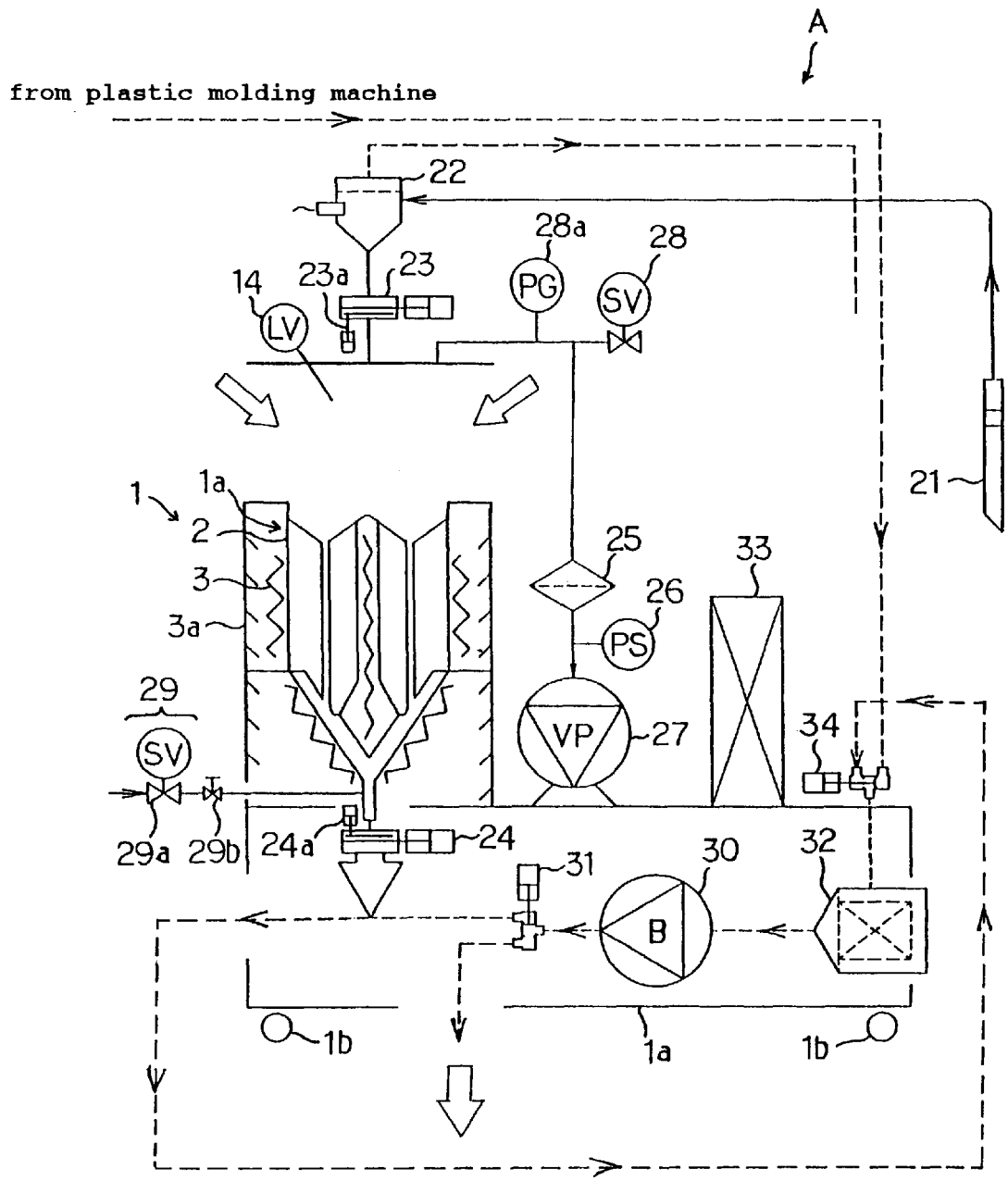
FIG. 14 is a schematic diagram showing a dust collection mechanism of a preferred embodiment of the vacuum-type automatic dehumidifying and drying apparatus for powdered or granular material according to the present invention.
Figure 15:
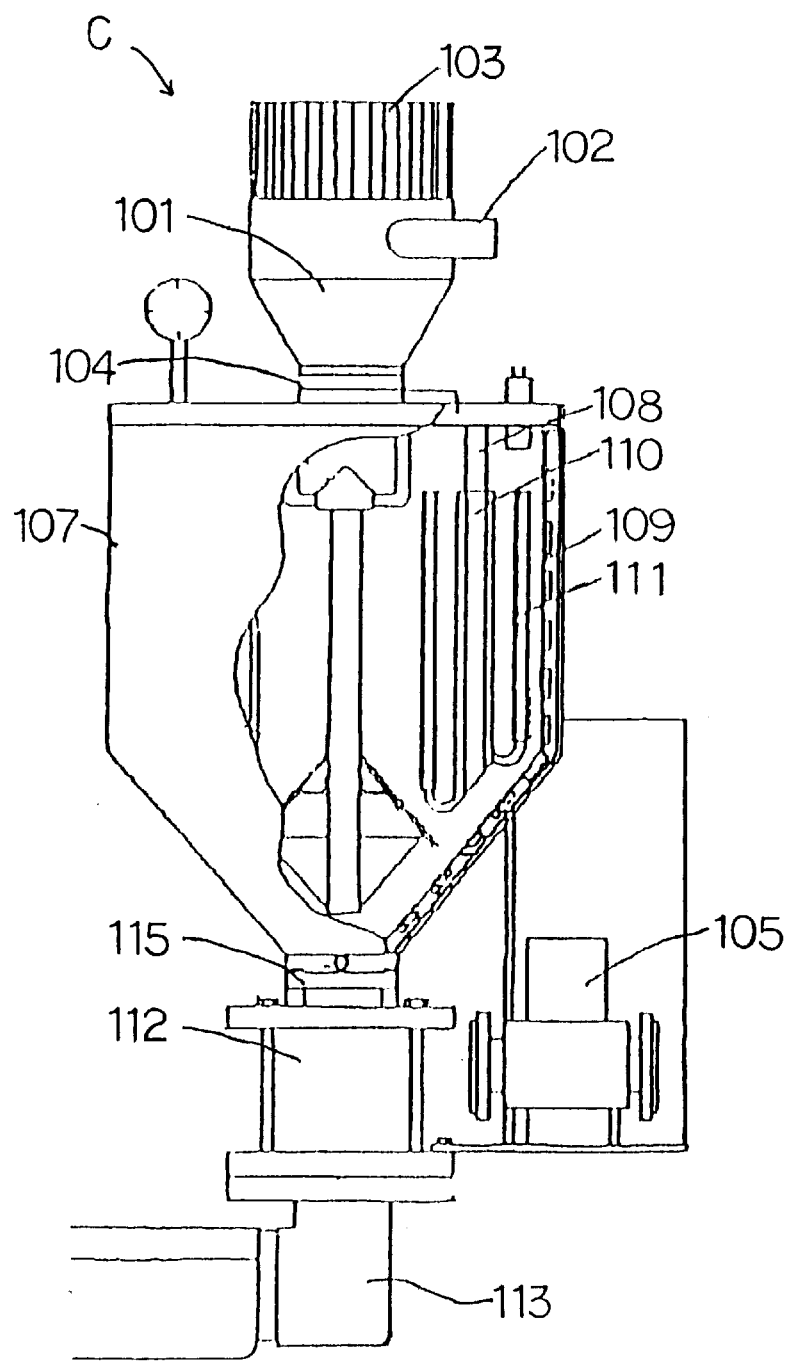
FIG. 15 is a partially cut away outer front view showing one embodiment of the conventional vacuum-type automatic dehumidifying and drying apparatus.

FIG. 14 is a schematic diagram showing a dust collection mechanism of a preferred embodiment of a vacuum-type automatic dehumidifying and drying apparatus for powdered or granular material according to the present invention.

The dust collection mechanism is applied when the hopper dryer 1 is cleaned with pressurized air by removing the detachable upper cover 8 of the drying hopper 1.

In this case, the transport switch valve 30 and the switch valve 34 are operated, piping to a plastic molding machine at a next step is connected to a suction side of the switch valve 34 by means of a bypass piping, gas in the drying hopper 1 is suck and collected by means of the transport blower 30, and air flow passing through the transport filter 32 is generated.

Accordingly dust in the drying hopper 1 caused in case of cleaning is suck and collected in the transport filter 32 so that scattering of dust can be prevented.

What is claimed is:

1. A vacuum-type automatic dehumidifying and drying apparatus for powdered or granular material such as a pelletized or powdered resin or the like, provided with a drying hopper connected to an evacuating means having at its bottom a material discharge valve, and with a material collector communicating with the drying hopper via a material feed valve above the drying hopper for collecting the powdered material therein comprising;

a double constructed drying hopper having a cylindrical main body made of a high heat conductivity material provided on its inner peripheral surface with plural fins, which define compartment walls, projecting inwardly and on its outer peripheral surface with a heating means surrounding said cylindrical main body, said hopper being constructed such that said main body is outwardly enclosed with a heat insulation wall, an outer air inlet provided with said main body for introducing outer air into said drying hopper, a material sensor in said hopper for detecting amount of the material stored in said hopper, and an evacuating means connected to said main body for evacuating said main body, whereby powdered material which is fed and stored in said drying hopper until said material sensor is turned off is heated in said main cylindrical body by driving said heating means while keeping said drying hopper vacuum by said evacuating means during dehumidifying and drying process, while required amount of dehumidified and dried powdered material in said drying hopper is discharged by opening the material discharge valve after said drying hopper is returned to an atmospheric pressure condition by opening said outer air inlet, and sequentially powdered material is fed again from the material collector to said hopper for next dehumidifying and drying process by opening said material feed valve until said material sensor is turned off.

2. The vacuum-type automatic dehumidifying and drying apparatus as set forth in claim 1, wherein said drying hopper is provided with a leak adjustment mechanism with a leak hole for controlling introduction amount of a carrier gas to be fed from outside into said drying hopper, of which moisture and temperature have been previously controlled, whereby miscellaneous useless gas generated in said drying hopper is discharged corresponding to the amount of said carrier gas introduced through said leak adjustment mechanism by driving said evacuating means during dehumidifying and drying process.

3. The vacuum-type automatic dehumidifying and drying apparatus as set forth in claim 1, wherein said drying hopper comprises an outer compartment member provided on its inner peripheral surface with said plural fins, defining compartment walls, radially projecting toward the center of said main body, each fin of said outer compartment wall being formed at its upper end with an upper cut-away portion which is inclined downwardly to the center of said main body and at its lower end with a lower cut-away portion which is inclined downwardly to the center of said main body, an inner compartment member disposed in the center space of said main body and having plural fins radially projecting toward said fins of said outer compartment member, each fin of said inner compartment member being formed at its upper end with an upper cut-away portion which is inclined downwardly to said fins of said outer compartment member and at its lower end with a lower cut-away portion which is inclined downwardly to said fins of said outer compartment member, and a bevel regulating member disposed under said inner compartment member between a material discharging hole of said drying hopper and said inner compartment member, whereby material fed into said drying hopper is sequentially dehumidified and dried in said drying hopper and thereafter discharged in a manner of first-in and first-out execution.

4. The vacuum-type automatic dehumidifying and drying apparatus as set forth in claim 1, wherein said material discharge valve further comprises a slide plate with a material discharging hole slidably disposed under a material discharging hole provided at the lower portion of said drying hopper, a discharge subsidizing pipe for inducing the material stored in said drying hopper through said material discharging hole, said discharge subsidizing pipe having a material induction portion projecting downwardly, and a driving means for reciprocating said slide plate between an open position for discharging the material where said material discharging hole of said slide plate conforms with said material discharging hole of said drying hopper and a close position for stopping discharging of the material.

5. The vacuum-type automatic dehumidifying and drying system as set forth in claim 1, wherein said material feed valve is provided at an upper cover of said main body of said drying hopper, said cover is detachably attached to said main body of said drying hopper.

6. The vacuum-type automatic dehumidifying and drying system as set forth in claim 1, wherein said material feed valve is provided at an upper cover of said main body of said drying hopper, said cover is pivotally jointed to said main body of said drying hopper in a manner capable of being opened and closed.

* * * * *